United States Patent
Brantley et al.

(10) Patent No.: US 8,685,290 B2
(45) Date of Patent: Apr. 1, 2014

(54) GLASS-CRYSTALLINE PARTICLE POWDERS INCLUDING A GLASS COMPONENT AND A CRYSTALLINE COMPONENT

(75) Inventors: Eric Lee Brantley, Wilmington, DE (US); John T. Chaplinsky, Raleigh, NC (US); Howard David Glicksman, Durham, NC (US); James J. Krajewski, Somerville, NJ (US); Brian J. Laughlin, Apex, NC (US); Kurt Richard Mikeska, Hockessin, DE (US); Lawrence V. Triboletti, Cary, NC (US)

(73) Assignee: E I du Pont Nemours and Company, Wilmington, DE (US)

( * ) Notice: Subject to any disclaimer, the term of this patent is extended or adjusted under 35 U.S.C. 154(b) by 592 days.

(21) Appl. No.: 12/891,218

(22) Filed: Sep. 27, 2010

(65) Prior Publication Data
US 2011/0233485 A1  Sep. 29, 2011

Related U.S. Application Data

(60) Provisional application No. 61/246,176, filed on Sep. 28, 2009.

(51) Int. Cl.
*H01B 1/12* (2006.01)

(52) U.S. Cl.
USPC ........... 252/519.3; 252/518.1; 501/9; 501/10; 501/32; 524/492

(58) Field of Classification Search
USPC ......... 252/500, 518.1, 519.3; 524/492; 510/9, 510/10, 32
See application file for complete search history.

(56) References Cited

U.S. PATENT DOCUMENTS

| | | | |
|---|---|---|---|
| 4,564,556 A | 1/1986 | Lange | |
| 6,000,241 A | 12/1999 | Ranade et al. | |
| 6,360,562 B1 | 3/2002 | Kodas et al. | |
| 6,866,929 B2 | 3/2005 | Kodas et al. | |
| 7,141,520 B2 | 11/2006 | Zimmer et al. | |
| 7,175,786 B2 | 2/2007 | Celikkaya et al. | |
| 7,258,707 B2 | 8/2007 | Celikkaya et al. | |
| 2001/0056021 A1* | 12/2001 | Nagata et al. | 501/9 |
| 2002/0007650 A1 | 1/2002 | Hattori et al. | |

FOREIGN PATENT DOCUMENTS

| | | | |
|---|---|---|---|
| JP | 06 211542 A | 8/1994 | |
| JP | 08-091874 * | 4/1996 | ............. C03C 12/00 |
| JP | 08-310836 * | 11/1996 | ............. C03C 12/00 |
| JP | 08 310836 A | 11/1996 | |
| JP | 10-194846 * | 7/1998 | ............ C04B 35/622 |
| WO | 00/12437 A1 | 3/2000 | |

OTHER PUBLICATIONS

PCT International Search Report and Written Opinion, mailed Jan. 12, 2011.

(Continued)

*Primary Examiner* — Khanh Tuan Nguyen (57) ABSTRACT

Disclosed is a plurality of glass-crystalline particles, wherein at least a portion of the glass-crystalline particles comprise a glass component and a crystalline component, and wherein the crystalline component comprises one or more metal oxides wherein the metal is selected from the group consisting of: Zn, Ca, Sr, Mg, Ba, and mixtures thereof.

14 Claims, 4 Drawing Sheets

(56) References Cited

OTHER PUBLICATIONS

PCT International Search Report and Written Opinion, mailed Dec. 27, 2010 for co-pending U.S. Appl. No. 12/891,244.
PCT International Search Report and Written Opinion, mailed Dec. 27, 2010 for co-pending U.S. Appl. No. 12/891,199.
Cho, Jung Sang et al., Synthesis of spherical shape borate-based bioactive glass powders prepared by ultrasonic spray pyrolysis, Ceramics International, Aug. 1, 2009, pp. 2103-2109, vol. 35, No. 6, Elsevier, Amsterdam, NL.
Ko, You Na et al., Effect of precursor types on the characteristics of the Pb-based glass powderes prepared by spray pyrolysis, Ceramics International, Sep. 23, 2009, pp. 395-399, vol. 36, No. 1, Elsevier, Amsterdam, NL.
Shieh, Y. N. et al., Constitution of laser melted $Al_2O_3$-$MgO$-$SiO_2$ ceramics, Materials Science and Technology, Sep. 1995, pp. 863-869, vol. 11, No. 9, Maney Publishing, GB.
Dyamant et al., Thermal properties and glass formation in the $SiO2$-$B2O3$-$Bi2O3$-$ZnO$ quaternary system, Journal of Non-Crystalline Solids, pp. 3503-3507, vol. 351, No. 43-45, North-Holland Physics Publishing, Amsterdam, NL.
Hu, A. M. et al., Crystallization and properties of a spodumene-willemite glass ceramic, Thermochimica Acta, Oct. 15, 2005, pp. 110-113, vol. 437, No. 1-2, Elsevier Science Publishers, Amsterdam, NL.
Albarran, J. L. et al., Properties of Reinforced Glass with Crystalline Particles, Materials and Manufacturing Processes, 2006, pp. 115-119, vol. 21, Taylor & Francis LLC.

\* cited by examiner

GLASS-CRYSTALLINE PARTICLE POWDERS INCLUDING A GLASS COMPONENT AND A CRYSTALLINE COMPONENT

FIELD OF THE INVENTION

The invention relates to glass-crystalline particle powders including a glass component and a crystalline component.

BACKGROUND OF THE INVENTION

Many product applications require glass powders that have one or more of the following properties: high purity, controlled chemistry, spherical morphology, small average size, narrow size distribution, and little or no agglomeration. Glass powder applications requiring such characteristics include, but are not limited to, thick film pastes used for fabricating electronic devices. Thick film pastes are mixture of the powders in an organic vehicle, wherein the organic vehicle is removed after application of the paste to a substrate by firing the composition at elevated temperatures.

Most glass powders are produced by forming a melt of the desired glass composition, quenching the molten glass and milling the resulting glass to reduce the particle size. A glass lacks the long range regular periodic arrangement of atoms characteristic of materials considered crystalline to one skilled in the art. When glass is analyzed by X-ray diffraction the resulting data lacks the distinct peaks seen in materials considered crystalline, yet instead shows a broad signal over wider range of $2\theta$ angles; this range being typical greater than 5 to 20° $2\theta$. The milling process results in glass powders having an irregular morphology and high surface area which can be undesirable in precision applications.

Aerosol decomposition of an atomized liquid spray of precursor solution is a useful method for producing glass-crystalline particles and spherical glass-crystalline particles with high purity, controlled chemistry, small average size, narrow size distribution, and little or no agglomeration. In such a process, a precursor solution containing the elements desired in the final glass is atomized to produce an aerosol. The aerosol particles are then transported through a reaction tube where the solvent is removed and the aerosol particles are heated to a temperature sufficiently high to convert the precursor compounds to product glass particles. At these high temperatures a suitable material of construction reactor tube needs to be used.

There is a need for glasses with improved properties including making particles with a spherical shape and making glass-containing particles. There is need for improved aerosol methods useful for the production of glass powders. In addition, there is a need for improved devices useful in the methods of making glasses by aerosol methods.

SUMMARY OF THE INVENTION

The invention relates to a plurality of glass-crystalline particles, wherein at least a portion of the glass-crystalline particles include a glass component and a crystalline component, and wherein the crystalline component includes one or more metal oxides wherein the metal is selected from the group consisting of: Zn, Ca, Sr, Mg, Ba, and mixtures thereof. At least a portion of the glass-crystalline particles may be substantially spherical. An aspect relates to a powder including the plurality of glass-crystalline particles. The surface area of at least a portion of the particles may be between 0.1 $m^2/g$ and 3.0 $m^2/g$. The $d_{50}$ may be between 0.2 microns and 3.0 microns. The $d_{95}$ may be between 0.5 microns and 5.0 microns. The surface area divided by the $d_{10}$ of at least a portion of the glass-crystalline particles may be between 0.5 $m^2/g \cdot \mu m$ and 5.0 $m^2/g \cdot \mu m$. The surface area divided by the $d_{50}$ of at least a portion of the glass-crystalline particles may be between 0.3 $m^2/g \cdot \mu m$ and 3.0 $m^2/g \cdot \mu m$. The surface area divided by the $d_{95}$ of at least a portion of the glass-crystalline particles may be between 0.2 $m^2/g \cdot \mu m$ and 2.0 $m^2/g \cdot \mu m$.

An embodiment relates to a plurality of glass-crystalline particles, wherein at least a portion of the glass-crystalline particles may be spherical, wherein at least a portion of the glass-crystalline particles may include a glass component and a crystalline component, and wherein the crystalline component may include one or more metal oxides. The metal of the one or more metal oxides may be selected from the group consisting of: Zn, Ca, Sr, Mg, Ba, and mixtures thereof. The surface area may be from 0.1 $m^2/g$ to 3.0 $m^2/g$.

An embodiment relates to a plurality of glass-crystalline particles, wherein at least a portion of the glass-crystalline particles include a glass component and a crystalline component, wherein the crystalline component may be 45-80 wt % of the particle, and wherein the crystalline component may include one or more metal oxides.

An aspect relates to a thick film composition including an organic medium, a conductive powder, and a plurality of glass-crystalline particles.

A further aspect relates to a device including, prior to firing, a thick film composition.

DETAILED DESCRIPTION OF THE INVENTION

An aspect of the invention relates to a glass-crystalline particle including a glass component and a crystalline component wherein the crystalline component includes one or more metal oxides and the method of making the glass-crystalline particles. In an embodiment, the metal in the metal oxides may be one or more metal oxides selected from the group consisting of Zn, Mg, Ca, Sr, Ba, and mixtures thereof.

A further aspect of the invention relates to a glass-crystalline particle including a composition that contains a glass component and a crystalline component wherein the crystalline component is between 45 wt % and 80 wt %, based on the weight of the composition. In an embodiment, the crystalline composition may be 45 wt % to 72 wt %, based on the weight of the composition. In an embodiment, the crystalline composition may be between 50 wt % to 68 wt %, based on the weight of the composition. A portion of the crystalline component may be on the surface of the particle. In an embodiment, 5% to 100% of the crystalline component may be on the surface of the particle.

A further aspect of the invention relates to a glass-crystalline particle including a composition that contains a glass component and a crystalline component wherein the glass component is between 20 wt % to 55 wt %, based on the weight of the composition. In an embodiment, the glass composition may be between 28 wt % to 55 wt %, based on the weight of the composition. In an aspect, the glass composition may be between 32 wt % and 50 wt %, based on the weight of the composition.

In an embodiment, the glass-crystalline particle may have areas on the surface that are crystalline metal oxide and separate areas on the surface that are glass. FIG. 1 shows the BS-SEM picture presenting the areas on the surface that are glass and other areas on the surface that are the crystalline metal oxide. In an embodiment, the crystalline component may include distinct separate crystals. The crystals may include a metal oxide. In an embodiment, the crystals may also include a metal silicate. The crystals may be the same shape, or different shapes. The crystals may be rectangular, hexagons, ovals, for example.

An aspect of the invention relates to a glass-crystalline powder containing a plurality of glass-crystalline particles including a glass component and a crystalline component wherein the crystalline component includes one or more crystalline metal oxides and the method for making glass-crystalline powders. In an aspect, the metal in the metal oxides may be one or more metal oxides selected from the group consisting of Zn, Mg, Ca, Sr, Ba, and mixtures thereof. In an aspect, the metal in the metal oxide may be Zn, Mg, or mixtures thereof. In an aspect, the metal in the metal oxide may be Zn.

In an embodiment, the glass-crystalline particle may be spherical in shape. In an aspect of this embodiment, the surface area to particle size ratio is minimized, as compared to non-spherical particles.

A further aspect of the invention relates to a spherical glass-crystalline particle including a glass component and a crystalline component wherein the crystalline component includes one or more metal oxides and the method for producing spherical glass-crystalline particles. In an embodiment, the metal in the metal oxides is one or more metal oxides selected from the group consisting of Zn, Mg, Ca, Sr, Ba, and mixtures thereof.

A further aspect of the invention relates to a spherical glass-crystalline particle including a composition that contains a glass component and a crystalline component wherein the crystalline component may be between 45 wt % and 80 wt %, based on the weight of the composition. In an embodiment, the crystalline composition may be between 45 wt % and 72 wt %, based on the weight of the composition. In an embodiment, the crystalline composition may be between 50 wt % and 68 wt %, based on the weight of the composition. A portion of the crystalline component may be on the surface of the particle.

A further aspect of the invention relates to a spherical glass-crystalline particle including a composition that contains a glass component and a crystalline component wherein the glass component may be between 20 wt % and 55 wt %, based on the weight of the composition. In an embodiment, the crystalline composition may be between 28 wt % and 55 wt %, based on the weight of the composition. In an embodiment, the crystalline composition may be between 32 wt % and 50 wt %, based on the weight of the composition.

A further aspect of the invention relates to a spherical glass-crystalline powder containing a plurality of spherical glass-crystalline particles including a glass component and a crystalline component wherein the crystalline component includes one or more crystalline metal oxides and the method to prepare spherical glass-crystalline powders. In an aspect, the metal in the metal oxides may be one or more metal oxides selected from the group consisting of Zn, Mg, Ca, Sr, Ba, and mixtures thereof.

In an embodiment, the glass-crystalline powder or spherical glass-crystalline powder may have a low surface area. In an aspect of this embodiment, the surface area ranges from 0.1 m$^2$/g to 3.0 m$^2$/g. In an aspect, the surface area ranges from 0.5 m$^2$/g to 3.0 m$^2$/g. In a further aspect, the surface area ranges from 0.5 m$^2$/g to 2.0 m$^2$/g. The spherical glass-crystalline powder may be small in size with a particle size distribution. The particle size distribution is characterized by specific percent volume distribution sets; $d_{10}$ refers to the 10% volume distribution set; $d_{50}$ refers to the 50% volume distribution set; and $d_{95}$ refers to the 95% volume distribution set. In an embodiment, the glass-crystalline powders or spherical glass-crystalline powders may have $d_{50}$ from 0.2 microns to 3.0 microns, and $d_{95}$ is from 0.5 to 5.0 microns. In an aspect, the $d_{50}$ may be from 0.5 microns to 3.0 microns and the $d_{95}$ may be from 1.0 microns to 5.0 microns. In an aspect, the $d_{50}$ may be from 0.7 microns to 2.0 microns and $d_{95}$ from 1.0 microns to 4.0 microns. In an embodiment, the spherical glass-crystalline powder may have a small ratio of surface to particle size distribution. In an aspect of this embodiment, the surface area divided by the $d_{10}$ may be from 0.5 m$^2$/g·µm to 5.0 m$^2$/g·µm, the surface area divided by the $d_{50}$ may be from 0.3 m$^2$/g·µm to 3.0 m$^2$/g·µm and the surface area divided by the $d_{95}$ may be from 0.2 to m$^2$/g·µm 2.0 m$^2$/g·µm. In an aspect of this embodiment, the surface area divided by the $d_{10}$ may be from 1.0 m$^2$/g·µm to 5.0 m$^2$/g·µm, the surface area divided by the $d_{50}$ may be from 0.5 m$^2$/g·µm to 3.0 m$^2$/g·µm and the surface area divided by the $d_{95}$ may be from 0.2 m$^2$/g·µm to 1.5 m$^2$/g·µm. In an aspect of this embodiment, the surface area divided by the $d_{10}$ may be from 1.0 m$^2$/g·µm to 4.0 m$^2$/g·µm, the surface area divided by the $d_{50}$ may be from 0.5 m$^2$/g·µm to 2.0 m$^2$/g·µm and the surface area divided by the $d_{95}$ may be from 0.3 m$^2$/g·µm to 1.0 m$^2$/g·µm.

A further aspect of the invention relates to a method for the manufacture of glass-crystalline particles or spherical glass-crystalline particles including a glass component and a crystalline component wherein the crystalline component includes one or more crystalline metal oxide components including metal oxides including the sequential steps:

a. providing a precursor solution containing the solvent and the glass component composition and the crystalline component composition used to form the aerosol that contains the glass-crystalline particle components comprising one or more metal oxides, and a solvent;

b. forming an aerosol including finely divided droplets of the precursor solution, wherein the droplet concentration which is below the concentration where collisions and subsequent coalescence of the droplets results in a 10% reduction in droplet concentration; and
c. heating the aerosol wherein, upon heating, glass-crystalline particles are formed, wherein the glass-crystalline particles include a glass component and a crystalline component, and wherein the crystalline component includes one or more metal oxides; and d. isolating the glass-crystalline particles.

As used herein with respect to a spherical glass-crystalline particle including a glass component and a crystalline component, the term "precursor solution" means the solution containing the solvent and the glass component composition and the crystalline component composition.

An aspect of the invention relates to glass component compositions. In an embodiment, glass component compositions are listed in Table 1 below.

TABLE 1

| Glass No. | $Al_2O_3$ | $B_2O_3$ | $Bi_2O_3$ | $Li_2O$ | $Na_2O$ | F | $P_2O_5$ | $PbF_2$ | PbO | $SiO_2$ | $CeO_2$ | $TiO_2$ | ZnO | $ZrO_2$ |
|---|---|---|---|---|---|---|---|---|---|---|---|---|---|---|
| 1 | 0.27 | 3.84 | 64.00 | 1.50 | 1.65 | — | — | — | — | 21.93 | — | 2.01 | — | 4.80 |
| 2 | 0.29 | 3.85 | 58.99 | 1.50 | 1.65 | — | — | — | — | 26.91 | — | 2.01 | — | 4.81 |
| 3 | 0.30 | 3.75 | 63.60 | — | 4.65 | — | — | — | — | 21.69 | — | 1.97 | — | 4.04 |
| 4 | 0.29 | 3.85 | 63.99 | 4.50 | 4.91 | — | — | — | — | 15.63 | — | 2.01 | — | 4.82 |
| 5 | 0.28 | 3.84 | 64.00 | 2.25 | 2.46 | — | — | — | — | 20.35 | — | 2.01 | — | 4.81 |
| 6 | — | 3.85 | 64.18 | 1.50 | 1.65 | — | — | — | — | 21.98 | — | 2.02 | — | 4.82 |
| 7 | 0.30 | 4.08 | 68.00 | 1.59 | 1.74 | — | — | — | — | 23.29 | 1.00 | — | — | — |
| 8 | 0.30 | 4.12 | 68.69 | 1.61 | 1.76 | — | — | — | — | 23.52 | — | — | — | — |
| 9 | 0.29 | 3.85 | 68.98 | 1.50 | 1.65 | — | — | — | — | 16.91 | — | 2.01 | — | 4.81 |
| 10 | 0.36 | 6.94 | 6.30 | — | — | 6.60 | — | — | 51.67 | 22.70 | — | 5.43 | — | — |
| 11 | 0.43 | 8.41 | 7.63 | — | — | 1.67 | — | — | 62.58 | 12.70 | — | 6.58 | — | — |
| 12 | 0.31 | 6.08 | 5.51 | — | — | 1.67 | — | — | 45.82 | 35.85 | — | 4.75 | — | — |
| A | 2.71 | — | — | — | — | — | 3.48 | 24.06 | 36.50 | 11.79 | — | — | 19.96 | 1.51 |
| B | 1.61 | 3.02 | — | — | — | — | — | — | 32.33 | 17.17 | — | 0.53 | 45.34 | — |

Glass component compositions are described herein as including percentages of certain glass component composition constituents. Specifically, the percentages are the percentages of oxide or fluoride components that one skilled in the art of glass making or inorganic chemistry would expect to result from the processing as described herein to form the glass component composition. Such nomenclature is conventional to one of skill in the art. In other words, the glass component composition contains certain constituents, and the percentages of those constituents are expressed as a percentage of the corresponding oxide form.

If starting with a synthesized glass sample, one of skill in the art may calculate the percentages of starting glass component composition constituents described herein using methods known to one of skill in the art including, but not limited to: Inductively Coupled Plasma-Emission Spectroscopy (ICPES), Inductively Coupled Plasma-Atomic Emission Spectroscopy (ICP-AES), and the like. In addition, the following exemplary techniques may be used: X-Ray Fluorescence spectroscopy (XRF); Nuclear Magnetic Resonance spectroscopy (NMR); Electron Paramagnetic Resonance spectroscopy (EPR); Mössbauer spectroscopy; Electron microprobe Energy Dispersive Spectroscopy (EDS); Electron microprobe Wavelength Dispersive Spectroscopy (WDS); Cathodoluminescence (CL); digestion into a liquid medium and selective ion electrode.

In an embodiment, the glass component composition may include one or more glass former constituents. In an embodiment, the glass component of the glass-crystalline particle may include one or more glass former constituents. Glass former constituents may include, but are not limited to: $SiO_2$, $P_2O_5$, $B_2O_3$, and $GeO_2$. In an embodiment, the one or more glass former constituents may be 1 to 90 wt %, 2 to 60 wt %, or 3 to 55 wt % of the glass component composition.

The glass component compositions described herein, including those listed in Table I, are not limiting; it is contemplated that one of ordinary skill in the art of glass chemistry could make minor substitutions of additional ingredients and not substantially change the desired properties of the glass component composition. For example, substitutions of glass formers such as $P_2O_5$ 0-3, $GeO_2$ 0-3, $V_2O_5$ 0-3 in weight % may be used either individually or in combination to achieve similar performance. For example, one or more intermediate oxides, such as $TiO_2$, $Ta_2O_5$, $Nb_2O_5$, $ZrO_2$, $CeO_2$, and SnO2 may be substituted for other intermediate oxides (i.e., $Al_2O_3$, $CeO_2$, $SnO_2$) present in a glass component composition.

Exemplary, non-limiting glass component compositions described herein, in weight percent total glass component composition, are shown in Table 1. In an embodiment, glass component compositions described herein may include one or more of $SiO_2$, $Al_2O_3$, PbO, $ZrO_2$, $B_2O_3$, $Na_2O$, $Li_2O$, $Bi_2O_3$, $CeO_2$, $TiO_2$, or anionic fluorine. In aspects of this embodiment, the:

| | | | |
|---|---|---|---|
| $SiO_2$ may be | 10 to 40 wt %, | 12 to 35 wt %, | or 17 to 25 wt %, |
| $Al_2O_3$ may be | 0 to 1 wt %, | 0.25 to 0.35 wt %, | or 0.35 to 0.45 wt %, |
| $ZrO_2$ may be | 0 to 6 wt %, | 0.1 to 5 wt %, | or 4 to 5 wt %, |
| PbO may be | 0 to 65 wt %, | 45 to 65 wt %, | or 50 to 55 wt %, |
| $B_2O_3$ may be | 1 to 10 wt %, | 5 to 9 wt %, | or 3 to 5 wt %, |
| $TiO_2$ may be | 0 to 7 wt %, | 4.5 to 6.5 wt %, | or 1.5 to 2.5 wt %, |
| $Na_2O$ may be | 0 to 7 wt %, | 0.1 to 5 wt %, | or 1 to 3 wt %, |
| $Li_2O$ may be | 0 to 7 wt %, | 0.1 to 5 wt %, | or 1 to 3 wt %, |
| $Bi_2O_3$ may be | 5 to 70 wt %, | 55 to 70 wt %, | or 5.5 to 7.5 wt %, |
| $CeO_2$ may be | 0 to 3 wt %, | 0.1 to 2.5 wt %, | or 0.5 to 1.5 wt %, or |
| F may be | 0 to 10 wt %, | 1 to 7 wt %, | or 1.5 to 6.5 wt %, | based on the weight of the glass component composition.

In another embodiment, glass component compositions described herein may include one or more of $SiO_2$, $Al_2O_3$, $ZrO_2$, $B_2O_3$, $Na_2O$, $Li_2O$, $Bi_2O_3$, $CeO_2$, and TiO2. In aspects of this embodiment, the:

| | | | |
|---|---|---|---|
| $SiO_2$ may be | 10 to 35 wt %, | 15 to 30 wt %, | or 20 to 25 wt %, |
| $Al_2O_3$ may be | 0 to 1 wt %, | 0.1 to 0.35 wt %, | or 0.25 to 0.3 wt %, |
| $ZrO_2$ may be | 0 to 6 wt %, | 0.1 to 5 wt %, | or 4 to 5 wt %, |
| $B_2O_3$ may be | 1 to 5 wt %, | 3 to 5 wt %, | or 3.75 to 4.25 wt %, |
| $TiO_2$ may be | 0 to 3 wt %, | 1 to 2.5 wt %, | or 1.75 to 2.25 wt %, |
| $Na_2O$ may be | 0 to 7 wt %, | 0.1 to 5 wt %, | or 1 to 3 wt %, |
| $Li_2O$ may be | 0 to 7 wt %, | 0.1 to 5 wt %, | or 1 to 3 wt %, |

-continued

| | | | |
|---|---|---|---|
| $Bi_2O_3$ may be | 55 to 70 wt %, | 59 to 69 wt %, | or 63 to 65 wt %, or |
| $CeO_2$ may be | 0 to 3 wt %, | 0.1 to 2.5 wt %, | or 0.5 to 1.5 wt %, | based on the weight of the glass component composition.

In still another embodiment, glass component compositions described herein may include one or more of $SiO_2$, $Al_2O_3$, PbO, $B_2O_3$, $Bi_2O_3$, $TiO_2$, or anionic fluorine. In aspects of this embodiment, the:

| | | | |
|---|---|---|---|
| $SiO_2$ may be | 10 to 40 wt %, | 12 to 25 wt %, | or 17 to 23 wt %, |
| $Al_2O_3$ may be | 0 to 1 wt %, | 0.1 to 0.5 wt %, | or 0.35 to 0.45 wt %, |
| PbO may be | 40 to 70 wt %, | 45 to 65 wt %, | or 50 to 60 wt %, |
| $B_2O_3$ may be | 5 to 10 wt %, | 6 to 9 wt %, | or 6.5 to 8 wt %, |
| $TiO_2$ may be | 3 to 7 wt %, | 4.5 to 6.5 wt %, | or 5 to 6 wt %, |
| $Bi_2O_3$ may be | 1 to 10 wt %, | 5 to 8 wt %, | or 6 to 7 wt %, or |
| F may be | 1 to 7 wt %, | 4 to 7 wt %, | or 1 to 2 wt %, | based on the weight of the glass component composition.

One skilled the art of making glass could replace some or all of the F, $Na_2O$ or $Li_2O$ with NaF, LiF, KF, CsF, RbF, $K_2O$, $Cs_2O$, or $Rb_2O$ and create a glass component with properties similar to the compositions listed above where this embodiment the total alkali metal oxide or metal fluoride content may be 0 to 7 wt %, 0.1 to 5 wt %, or 1 to 3 wt %, based on the weight of the glass component composition.

In a further embodiment, the glass component composition(s) herein may include one or more of a third set of components: $CeO_2$, $SnO_2$, $Ga_2O_3$, $In_2O_3$, NiO, $MoO_3$, $WO_3$, $Y_2O_3$, $La_2O_3$, $Nd_2O_3$, FeO, $HfO_2$, $Cr_2O_3$, CdO, $Nb_2O_5$, $Ag_2O$, $Sb_2O_3$, and metal halides (e.g. NaCl, KBr, NaI).

One of skill in the art would recognize that the choice of raw materials could unintentionally include impurities that may be incorporated into the glass component during processing. For example, the impurities may be present in the range of hundreds to thousands ppm. The presence of the impurities would not alter the properties of the glass component.

Any soluble salt can be used in the method of the invention in the glass precursor solution used to form the aerosols. Examples include metal nitrates, fluorides, chlorides, phosphates, sulfates, acetates, and the like. Specific examples include the suitable salts: $Al(NO_3)_3·9H_2O$, $Bi(NO_3)_3$, $H_3BO_3$, $Bi(OH)_3$, $LiNO_3$, $Zr(NO_3)_4$, $Zn(NO_3)_2$, $NaNO_3$, NaF, $Pb(NO_3)_2$, $PbF_2$, $Mn(CH_3COO)_2$, $Mn(NO_3)_2$, and the like. These soluble salts may be used in concentrations to just below the solubility limit of the particular salt.

In an embodiment the total glass component and crystalline component may be from 0.5 wt % to 20 wt %, based on the weight of the precursor solution. In a further embodiment, the total glass component and crystalline component may be from 1.0 wt % to 10 wt %, based on the weight of the precursor solution.

While, in an embodiment, water-soluble salts may be used as the source for the glass-crystalline particle components or spherical glass-crystalline particle components, one can use other solvent-soluble components such as organometallic compounds dissolved in either aqueous, organic solvents, or inorganic solvents.

Colloidal particles (smaller than 100 nanometers in size) containing compounds or elements may also be used for the glass-crystalline particle components or spherical glass-crystalline particle components provided the colloidal particles form a stable suspension in the precursor solution.

Operating Variables: The method of the invention can be carried out under a wide variety of operating conditions as long as the following fundamental criteria are met:

a. the concentration of the soluble components in the precursor solution used to form the aerosol must be below the saturation concentration at the feed temperature; and, in an embodiment, at least 10% below the saturation concentration in order to prevent precipitation of solids before removal of the liquid solvent;

b. the concentration of droplets in the aerosol must be sufficiently low so that it is below the concentration where collisions and subsequent coalescence of the droplets results in a 10% reduction in droplet concentration;

c. the temperature of the reactor must be suitable to form the spherical glass-crystalline particle.

Though it is essential to operate under the saturation point of the soluble precursor solution components, their concentration is not otherwise critical in the operation of the process. In an embodiment, higher concentrations may be used to maximize the amount of particles that can be made per unit of time and to produce larger particles.

Any of the conventional apparatus for droplet generation, as understood by one of ordinary skill in the art, may be used to prepare the aerosols for the invention including, but not limited to, nebulizers, Collison nebulizers, ultrasonic nebulizers, vibrating orifice aerosol generators, centrifugal atomizers, two-fluid atomizers, electrospray atomizers and the like. The particle size distribution of the glass powder is a direct function of the distribution of droplet sizes generated. The size of the droplets in the aerosol is not critical in the practice of the method of the invention. However, as mentioned above, it is important that the number of droplets not be so great as to incur excessive coalescence which broadens the particle size distribution.

In addition, for a given aerosol generator, concentration of the solution of the precursor components has an effect on particle size. In particular, particle size is an approximate function of the cube root of the concentration. Therefore, the higher the precursors component's concentration, the larger the particle size of the spherical glass particle. If a greater change in particle size is needed, a different aerosol generator may be used.

Virtually any gas which is inert or oxidizing can be used for the carrier gas and/or the quench gas. Examples of suitable inert gases include nitrogen and argon and suitable oxidizing gases include air, ozone, or nitrogen dioxide. In an embodiment, air may be used for the carrier gas and quench gas since it is oxidizing and is low cost.

The temperature range over which the method of the invention can be carried out is quite wide and ranges from the reaction temperature of the glass-crystalline particle components to the crystallization temperature of the glass component. This reaction temperature range varies from 300° C. to 1500° C. It is important to operate at a high enough temperature for the spherical glass-crystalline particle glass components and the crystalline components to react. In an embodiment, the reaction temperature may be above 600° C. to ensure complete reaction of the particles.

The type of apparatus used to heat the aerosol is not by itself critical and either direct or indirect heating may be used. For example, tube furnaces may be used or direct heating in combustion flames may be used. It is important to control the temperature so that the glass-crystalline particle components crystallize to form the glass-crystalline particle comprising a glass component and a crystalline component wherein the crystalline component comprises one or more metal oxides.

Upon reaching the reaction temperature and the glass-crystalline components or spherical glass-crystalline components are reacted, they are separated from the carrier gas, reaction by-products, and solvent volatilization products and the spherical glass-crystalline powder collected by one or more devices such as filters, cyclones, electrostatic separators, bag filters, filter discs and the like. Upon completion of the reaction, the gas consists of the carrier gas, volatile decomposition products of the spherical glass-crystalline particle components and solvent vapor. Thus, in the case of preparing high bismuth glass with crystalline zinc oxide from aqueous aluminum nitrate, boric acid, sodium nitrate, zinc nitrate, bismuth oxide, using air with as the carrier gas, the effluent gas from the method of the invention will consist of nitrogen oxides, water, oxygen gas, nitrogen gas, and carbon dioxide gas.

An embodiment relates to thick film compositions, also termed thick film pastes including the glass-crystalline powders or the spherical glass-crystalline powders described herein, conductive metal particles, and an organic medium. The thick film compositions may have suitable consistency and rheology for printing. In an embodiment, the conductive metal particles may be powders or flakes. The conductive metal particles may be one or more of the following: Ag, Pt, Pd, Cu, Au, and Al. The organic medium is a fugitive material, in that it is burnt off during the firing process. A wide variety of inert viscous materials can be used as organic medium. The organic medium must be one in which the metal powders are dispersible with an adequate degree of stability. The rheological properties of the medium must be such that they lend good application properties to the composition, including: stable dispersion of metal powders, appropriate viscosity and thixotropy for applying the material to a substrate, appropriate paste wettability of the substrate, and a good drying rate. The methods for applying the materials to the substrate include, but are not limited to: screen printing, extrusion, tape casting, dip coating, spray coating, and ink jetting. The organic vehicle used in the thick film composition of the present invention is preferably a non-aqueous inert liquid. Use can be made of any of various organic vehicles, which may or may not contain thickeners, stabilizers and/or other common additives. The organic medium is typically a solution of polymer(s) in solvent(s). Additionally, a small amount of additives, such as surfactants, may be a part of the organic medium. The most frequently used polymer for this purpose is ethyl cellulose. Other examples of polymers include ethylhydroxyethyl cellulose, wood rosin, mixtures of ethyl cellulose and phenolic resins, polymethacrylates of lower alcohols, and monobutyl ether of ethylene glycol monoacetate can also be used. The most widely used solvents found in thick film compositions are ester alcohols and terpenes such as alpha- or beta-terpineol or mixtures thereof with other solvents such as kerosene, dibutylphthalate, butyl carbitol, butyl carbitol acetate, hexylene glycol and high boiling alcohols and alcohol esters. In addition, volatile liquids for promoting rapid hardening after application on the substrate can be included in the vehicle. Various combinations of these and other solvents are formulated to obtain the viscosity and volatility requirements desired.

In an embodiment, the polymer present in the organic medium may be in the range of 1 wt % to 11 wt % of the total organic composition. The thick film composition of the present invention may be adjusted to a predetermined, screen-printable viscosity with the organic medium.

The ratio of organic medium in the thick film composition to the metal and inorganic components is dependent on the method of applying the paste and the kind of organic medium used, and it can vary. In an embodiment, the dispersion may contain 70-95 wt % of metal and inorganic components and 5-30 wt % of organic medium (vehicle) in order to obtain good wetting.

EXAMPLES

The following examples are provided to aid in understanding of the present invention, and are not intended to in any way limit the scope of the present invention. The details of the spherical glass-crystalline particle glass components compositions are found in Table 1. The compositions are presented in weight percent, based on the glass component composition.

Table 2 is shown below.

TABLE 2

| Example # | $Al(NO_3)_3 \cdot 9H_2O$ | $H_3BO_3$ | $Ba(NO_3)_2$ | $Bi(OH)_3$ | $Ce(NO_3)_3 \cdot 6H_2O$ | $LiNO_3$ | $Mg(NO_3)_2$ |
|---|---|---|---|---|---|---|---|
| 1 | 5.2 | 17.1 | 0.0 | 178.6 | 0.0 | 17.3 | 0.0 |
| 2 | 4.1 | 13.6 | 0.0 | 142.9 | 0.0 | 13.9 | 0.0 |
| 3 | 2.8 | 9.1 | 0.0 | 95.2 | 0.0 | 9.2 | 0.0 |
| 4 | 2.4 | 7.8 | 0.0 | 81.6 | 0.0 | 7.9 | 0.0 |
| 5 | 4.5 | 14.8 | 0.0 | 154.8 | 0.0 | 15.0 | 689.4 |
| 6 | 3.4 | 11.1 | 0.0 | 116.1 | 0.0 | 11.3 | 1034.0 |
| 7 | 1.3 | 6.2 | 0.0 | 3.5 | 0.0 | 0.0 | 0.0 |
| 8 | 1.6 | 7.5 | 4.3 | 1.7 | 0.0 | 0.0 | 0.0 |
| 9 | 1.1 | 5.4 | 3.1 | 1.7 | 0.0 | 0.0 | 0.0 |
| 10 | 0.9 | 4.1 | 0.0 | 2.3 | 0.0 | 0.0 | 0.0 |
| 11 | 3.9 | 11.7 | 0.0 | 124.2 | 0.0 | 0.0 | 0.0 |
| 12 | 0.0 | 10.3 | 0.0 | 107.4 | 0.0 | 10.4 | 0.0 |
| 13 | 5.0 | 16.5 | 0.0 | 172.5 | 0.0 | 16.7 | 0.0 |
| 14 | 2.8 | 9.3 | 0.0 | 104.8 | 0.0 | 9.4 | 0.0 |
| 15 | 2.8 | 5.2 | 0.0 | 87.1 | 0.0 | 3.1 | 0.0 |
| 16 | 3.2 | 10.4 | 0.0 | 100.8 | 0.0 | 10.6 | 0.0 |
| 17 | 3.2 | 10.4 | 0.0 | 109.3 | 0.0 | 31.8 | 0.0 |
| 18 | 3.4 | 11.1 | 0.0 | 116.1 | 3.9 | 11.3 | 0.0 |
| 19 | 1.9 | 6.4 | 0.0 | 66.5 | 0.0 | 6.5 | 0.0 |
| 20 | 0.0 | 12.4 | 0.0 | 130.0 | 0.0 | 12.6 | 0.0 |
| 21 | 5.9 | 17.9 | 0.0 | 190.7 | 0.0 | 0.0 | 34.3 |

TABLE 2-continued

| Example # | NaNO$_3$ | Pb(NO$_3$)$_2$ | fumed silica | TFA | Colloidal TiO$_2$ | Zn(NO$_3$)$_2$•6H$_2$O | Colloidal ZrO$_2$ |
|---|---|---|---|---|---|---|---|
| 1  | 11.3 | 0.0  | 54.8 | 0.0 | 36.7 | 0.0    | 60.13 |
| 2  | 9.0  | 0.0  | 43.8 | 0.0 | 29.3 | 731.1  | 48.10 |
| 3  | 6.0  | 0.0  | 29.2 | 0.0 | 2.7  | 974.9  | 32.06 |
| 4  | 5.2  | 0.0  | 25.1 | 0.0 | 16.8 | 1044.6 | 27.48 |
| 5  | 9.8  | 0.0  | 47.5 | 0.0 | 31.8 | 0.0    | 52.11 |
| 6  | 7.3  | 0.0  | 35.6 | 0.0 | 23.8 | 0.0    | 39.08 |
| 7  | 0.0  | 38.3 | 11.4 | 6.6 | 13.6 | 0.0    | 0.00 |
| 8  | 0.0  | 48.4 | 6.4  | 0.0 | 24.0 | 0.0    | 0.00 |
| 9  | 0.0  | 34.0 | 17.9 | 0.0 | 17.3 | 0.0    | 0.00 |
| 10 | 0.0  | 25.6 | 7.6  | 4.4 | 9.1  | 16.7   | 0.00 |
| 11 | 22.3 | 0.0  | 38.0 | 0.0 | 25.2 | 0.0    | 35.35 |
| 12 | 6.8  | 0.0  | 33.0 | 0.0 | 22.1 | 0.0    | 36.17 |
| 13 | 10.9 | 0.0  | 52.9 | 0.0 | 0.0  | 0.0    | 0.00 |
| 14 | 6.1  | 0.0  | 23.0 | 0.0 | 19.9 | 706.2  | 32.72 |
| 15 | 9.2  | 0.0  | 27.9 | 0.0 | 20.0 | 706.2  | 32.72 |
| 16 | 6.9  | 0.0  | 41.2 | 0.0 | 22.5 | 794.6  | 36.80 |
| 17 | 20.7 | 0.0  | 23.9 | 0.0 | 22.5 | 794.5  | 36.80 |
| 18 | 7.3  | 0.0  | 35.6 | 0.0 | 0.0  | 794.5  | 0.00 |
| 19 | 4.2  | 0.0  | 20.4 | 0.0 | 0.0  | 450.5  | 0.00 |
| 20 | 8.2  | 0.0  | 39.9 | 0.0 | 26.7 | 389.4  | 43.78 |
| 21 | 58.3 | 0.0  | 58.3 | 0.0 | 38.6 | 576.3  | 54.26 |

Table 2 describes the components of the precursor solutions for the Examples, made according the methods described in the Examples. Table 3 describes the physical properties of the materials described in the Examples. The tap density was measured using a tap density machine manufactured by Englesmann. The surface area was measured using a Micromeritics Tristar using the BET method. The He pycnometry density was measured using a Micromeritics Accupyc 1330. X-ray diffraction (XRD) was measured using a Rigaku Miniflex x-ray diffractometer for identification of the specific crystalline metal oxides which the glass-crystalline powders comprise. The particle size data was measured using a Micromeritics S3500. Scanning electron micrographs (SEM) and back scatter scanning electron micrographs (BS-SEM) were made using a JEOL JSM-6700F field emission SEM. Energy dispersive x-ray spectroscopy (EDX) was done using a Thermo Si(Li) detector manufactured by Thermo Fisher Scientific.

Example 1

A glass-crystalline particle including a glass component (glass No. 1 from Table 1) without any crystalline components wherein the glass component contains Al$_2$O$_3$, B$_2$O$_3$, Bi$_2$O$_3$, Li$_2$O, Na$_2$O, SiO$_2$, TiO$_2$, and ZrO$_2$ was prepared. As bismuth containing solution was prepared by the dissolution of Bi(OH)$_3$ in 923 g of nitric acid at 50° C. After the dissolution was complete, 1000 g of deionized water was added along with 5.1 g of Al(NO$_3$)$_3$.9H$_2$O, 17.3 g of LiNO$_3$, and 11.2 g of NaNO$_3$. The bismuth containing solution was then added to 2695 g of deionized water and 12.0 g of colloidal ZrO$_2$, 36.7 g of colloidal TiO$_2$, and 54.8 g of fumed SiO$_2$ were added to make the precursor solution. The precursor solution components are described in Table 2, and the properties are described in Table 3. An aerosol was then generated using air as the carrier gas flowing at 45 liters per minute and an ultrasonic generator with 36 ultrasonic transducers operating at 1.6 MHz. This aerosol was then sent through an impactor to remove oversized droplets and then sent into a 3 inch diameter, horizontal quartz tube located in a 3-zone furnace with a heated length of 36 inches. The 3 zones in the furnace were set at 1000° C. After exiting the furnace, the aerosol temperature was quenched with air and the spherical glass-crystalline particles comprising a glass component that includes Al$_2$O$_3$, B$_2$O$_3$, Bi$_2$O$_3$, Li$_2$O, Na$_2$O, SiO$_2$, TiO$_2$, and ZrO$_2$ was collected. SEM indicated that the glass particles were spherical and the XRD indicated an amorphous glass. This powder had a low surface area (SA) of 1.13 m$^2$/g and low ratios of surface area to particle size: SA/d$_{10}$ of 2.17, SA/D$_{50}$ of 1.33 and SA/D$_{95}$ of 0.50.

Example 2

A spherical glass-crystalline particle including a glass component (glass No. 2 from Table 1) and crystalline components wherein the crystalline components were ZnO and Zn$_2$SiO$_4$ and the glass component contains Al$_2$O$_3$, B$_2$O$_3$, Bi$_2$O$_3$, Li$_2$O, Na$_2$O, SiO$_2$, TiO$_2$, ZnO, and ZrO$_2$ was prepared. A bismuth containing solution was prepared by the dissolution of Bi(OH)$_3$ in 739 g of nitric acid at 50° C. After the dissolution was complete, 1000 g of deionized water was added along with 4.1 g of Al(NO$_3$)$_3$.9H$_2$O, 13.8 g of LiNO$_3$, 200 g of Zn(NO$_3$)$_2$.6H$_2$O and 9.0 g of NaNO$_3$. The bismuth containing solution was then added to 1956 g of deionized water and 48.1 g of colloidal ZrO$_2$, 29.3 g of colloidal TiO$_2$, and 43.8 g of fumed SiO$_2$ were added to make the precursor solution. The precursor solution components are described in Table 2, and the properties are described in Table 3. An aerosol was then generated using air as the carrier gas flowing at 45 liters per minute and an ultrasonic generator with 36 ultrasonic transducers operating at 1.6 MHz. This aerosol was then sent through an impactor to remove oversized droplets and then sent into a 3 inch diameter, horizontal quartz tube located in a 3-zone furnace with a heated length of 36 inches. The 3 zones in the furnace were set at 1000° C. After exiting the furnace, the aerosol temperature was quenched with air and the spherical glass-crystalline particles comprising a glass component that includes Al$_2$O$_3$, B$_2$O$_3$, Bi$_2$O$_3$, Li$_2$O, Na$_2$O, SiO$_2$, TiO$_2$, ZnO, and ZrO$_2$ and crystalline components that includes ZnO and Zn$_2$SiO$_4$ was collected. SEM indicated that the glass particles with the crystalline components were spherical and the XRD indicated the presence of crystalline ZnO and crystalline Zn$_2$SiO$_4$. BS-SEM revealed that the particles contained dark areas that were rich in crystalline ZnO and light areas were rich in glass. This powder had a low surface area (SA) of 1.03 m²/g and low ratios of surface area to particle size: SA/d₁₀ of 1.87, SA/D₅₀ of 1.03 and SA/D₉₅ of 0.38.

Examples 3 through 6

Examples 3 and 4 were made like Example 2 except for a change in the amount of Zn(NO₃)₂.6H₂O. Compositional details are shown in Table 2, and the physical properties are shown in Table 3. The results of SEM, BS-SEM and XRD analyses were similar to those of Example 2.

Examples 5 and 6 were made like Example 2 except Mg(NO₃)₂ was used instead of Zn(NO₃)₂.6H₂O. This resulted in spherical glass-crystalline particles containing glass components of Al₂O₃, B₂O₃, Bi₂O₃, Li₂O, Na₂O, SiO₂, TiO₂, and crystalline components of MgO and Mg₂SiO₄. Results were confirmed with SEM, BS-SEM, and XRD. Compositional details are shown in Table 2, and the physical properties are shown in Table 3, below.

TABLE 3

| Example # | Glass Type | Metal Oxide | Metal Oxide/Glass ratio | Carrier Gas(LPM) | Product Concentration % | Furnace (° C.) | Surface Area m²/g |
|---|---|---|---|---|---|---|---|
| 1 | 1 | none | 0 | 45.0 | 5.0 | 1000 | 1.13 |
| 2 | 1 | Zn | 1:1 | 45.0 | 8.5 | 1000 | 1.03 |
| 3 | 1 | Zn | 2:01 | 45.0 | 8.0 | 1000 | 1.27 |
| 4 | 1 | Zn | 2.5:1 | 45.0 | 7.9 | 1000 | 1.30 |
| 5 | 1 | Mg | 0.5:1 | 45.0 | 6.5 | 1000 | 2.17 |
| 6 | 1 | Mg | 1:01 | 45.0 | 6.5 | 1000 | 4.55 |
| 7 | 10 | none | 0 | 1.5 | 10.0 | 900 | 2.71 |
| 8 | 11 | none | 0 | 1.5 | 10.0 | 900 | 1.21 |
| 9 | 12 | none | 0 | 1.5 | 10.0 | 900 | 1.18 |
| 10 | 10 | Zn | 0.5:1 | 1.5 | 10.0 | 900 | 1.95 |
| 11 | 3 | none | 0 | 45.0 | 5.0 | 1000 | 1.22 |
| 12 | 6 | none | 0 | 45.0 | 5.0 | 1000 | 1.27 |
| 13 | 8 | none | 0 | 45.0 | 5.0 | 1000 | 1.10 |
| 14 | 9 | Zn | 1.42:1 | 45.0 | 8.2 | 1000 | 1.08 |
| 15 | 5 | Zn | 1.42:1 | 45.0 | 8.2 | 1000 | 1.07 |
| 16 | 2 | Zn | 1.42:1 | 45.0 | 8.2 | 1000 | 1.14 |
| 17 | 4 | Zn | 1.42:1 | 45.0 | 8.2 | 1000 | 1.06 |
| 18 | 7 | Zn | 1.42:1 | 45.0 | 5.0 | 1000 | 1.00 |
| 19 | 3 | Zn | 1.42:1 | 45.0 | 6.0 | 1000 | 1.22 |
| 20 | 6 | Zn | 1.42:1 | 45.0 | 6.0 | 1000 | 1.28 |
| 21 | 8 | Zn | 1.42:1 | 45.0 | 6.0 | 1000 | 1.09 |
| Comparative A | A | none | na | na | na | na | 8.52 |
| Comparative B | B | none | na | na | na | na | 3.78 |

| Example # | Density g/ml | d₁₀ microns | d₅₀ microns | d₉₀ microns | d₉₅ microns | Surface area/d₁₀ m²/g · microns | Surface Area/d₅₀ m²/g · microns | Surface area/d₉₅ m²/g · microns |
|---|---|---|---|---|---|---|---|---|
| 1 | 5.40 | 0.52 | 0.85 | 1.84 | 2.27 | 2.17 | 1.33 | 0.50 |
| 2 | 5.46 | 0.55 | 1.00 | 2.20 | 2.68 | 1.87 | 1.03 | 0.38 |
| 3 | 5.17 | 0.56 | 1.08 | 2.47 | 3.06 | 2.27 | 1.18 | 0.42 |
| 4 | 4.84 | 0.60 | 1.37 | 2.89 | 3.47 | 2.17 | 0.95 | 0.37 |
| 5 | 3.88 | 0.71 | 1.71 | 2.78 | 3.19 | 3.06 | 1.27 | 0.68 |
| 6 | 4.51 | 1.39 | 2.16 | 3.30 | 3.76 | 3.27 | 2.11 | 1.21 |
| 7 | 5.23 | 0.54 | 0.98 | 2.23 | 2.74 | 5.02 | 2.77 | 0.99 |
| 8 | 6.08 | 0.47 | 0.86 | 2.03 | 2.46 | 2.57 | 1.41 | 0.49 |
| 9 | 4.09 | 0.75 | 1.37 | 2.39 | 2.78 | 1.57 | 0.86 | 0.42 |
| 10 | 5.25 | 0.58 | 1.32 | 2.93 | 3.74 | 3.36 | 1.48 | 0.52 |
| 11 | 5.21 | 0.53 | 0.87 | 1.87 | 2.29 | 2.30 | 1.40 | 0.53 |
| 12 | 5.28 | 0.52 | 0.85 | 1.80 | 2.21 | 2.44 | 1.49 | 0.57 |
| 13 | 5.26 | 0.53 | 0.83 | 1.72 | 2.10 | 2.08 | 1.33 | 0.52 |
| 14 | 5.59 | 0.51 | 0.91 | 2.14 | 2.66 | 2.12 | 1.19 | 0.41 |
| 15 | 5.51 | 0.52 | 0.93 | 2.16 | 2.67 | 2.06 | 1.15 | 0.40 |
| 16 | 5.24 | 0.55 | 1.05 | 2.40 | 2.98 | 2.07 | 1.09 | 0.38 |
| 17 | 5.40 | 0.51 | 0.96 | 2.25 | 2.78 | 2.08 | 1.10 | 0.38 |
| 18 | 5.14 | 0.54 | 1.08 | 2.46 | 3.02 | 1.85 | 0.93 | 0.33 |
| 19 | 5.33 | 0.52 | 0.91 | 2.07 | 2.54 | 2.35 | 1.34 | 0.48 |
| 20 | 5.10 | 0.49 | 0.81 | 1.88 | 2.34 | 2.61 | 1.58 | 0.55 |
| 21 | 5.01 | 0.53 | 0.91 | 2.00 | 2.48 | 2.06 | 1.20 | 0.44 |
| Comparative A | 5.58 | 0.42 | 0.73 | 1.77 | 2.28 | 20.3 | 11.7 | 3.74 |
| Comparative B | 4.82 | 0.43 | 0.78 | 2.14 | 3.78 | 8.79 | 4.85 | 1.00 |

Examples 7 through 9

Examples 7 through 9 were made like Examples 1 except that the glass-containing portions contained lead. Compositional details are shown in Table 2, and the physical properties are shown in Table 3. The results of SEM, BS-SEM and XRD analyses were similar to those of Example 1.

Example 10

Example 10 was made like Example 2 except that the glass-containing portions contained lead. Compositional details are shown in Table 2, and the physical properties are shown in Table 3. The results of SEM, BS-SEM and XRD analyses were similar to those of Example 2.

Examples 11 through 13

Examples 11 through 13 were made like Example 1 except for a change in the glass composition. Compositional details are shown in Table 2, and the physical properties are shown in Table 3. The results of SEM, BS-SEM and XRD analyses were similar to those of Example 1.

Examples 14 through 21

Examples 14 through 21 were made like Example 2 except for a change in the glass composition. Compositional details are shown in Table 2, and the physical properties are shown in Table 3. The results of SEM, BS-SEM and XRD analyses were similar to those of Example 2.

COMPARATIVE EXAMPLES

The following examples describe glass powders made by conventional melting, provided for a comparison.

Comparative glass powder samples were synthesized using methods known to those skilled in the art as conventional glass making techniques. Ingredients were weighed then mixed in the desired proportions to make a glass with the compositions listed in Table 1 and then heated in a furnace to form a melt in platinum alloy crucibles. The resulting powder properties are shown in Table 3.

Comparative Example 1

Using techniques known to one of skill in the art, glass A (refer to Table 1) was made by heating the glass component composition to a peak temperature of 1100° C. and for a time such that the melt became entirely liquid and homogeneous. The molten glass was then quenched by pouring the molten glass directly into a room temperature bath of deionized water. The resulting glass frit or platelet was then milled to form a powder with its 50% volume distribution set between to a desired target (e.g. 0.8-1.5 micron).

Part of the molten glass was poured into a heated graphite mold and slow cooled to form a cast glass specimen. The sample was cooled by a slow enough rate to avoid residual stresses and thermal shock. The cast glass specimen was weighed while suspended in water to measure the glass density by the Archimede's method. Glass A had a density of 5.58 g/cc.

The synthesized powder was analyzed by XRD to assess devitrification products and backscatter scanning electron microscopy with ED to reveal powder morphology while obtaining data about chemical composition of morphological features. XRD data of the bulk powder displayed characteristics of partial crystallization in a glassy matrix. Crystalline willemite, $Zn_2SiO_4$, was observed to be present with possibly some Pb phosphates. BS-SEM and EDX revealed that the glass A powder included particles with an irregular shaped morphology characteristic of hard glassy materials which had been milled. The glass A powder contained particles of two distinct types; a population of homogenous particles appearing of lighter contrast in BS-SEM with a composition of the glass component composition when analyzed by EDX, and a distinctly different population of particles appearing of darker contrast in BS-SEM with a chemical make-up of only Zn, Si, and O indicating these were particles of crystalline willemite. Some of these darker particles could be observed with some traces of a lighter contrast residue of the glassy phase on periphery of individual particles. In general, these powder samples included of primary particles of either homogenous glass or crystalline willemite. This powder had a high surface area (SA) of 8.5 $m^2$/g and high ratios of surface area to particle size: $SA/d_{10}$ of 20.3, $SA/D_{50}$ of 11.7 and $SA/D_{95}$ of 3.74.

Comparative Example 2

Using techniques known to one of skill in the art, glass B (refer to Table 1) was made by heating the glass component composition to a peak temperature of 1400° C. and for a time such that the melt becomes entirely liquid and homogeneous. The molten glass was then quenched between counter rotating stainless steel rollers to form a 10-15 mil thick platelet of glass. The resulting glass frit or platelet was then milled to form a powder with its 50% volume distribution set between to a desired target (e.g. 0.8-1.5 micron).

Part of the molten glass was poured into a heated graphite mold and slow cooled to form a cast glass specimen. The sample was cooled at a slow enough rate to avoid residual stresses and thermal shock. The cast glass specimen was weighed while suspended in water to measure the glass density by the Archimedes's method. Glass A had a density of 4.82 g/cc.

Figure 1A:
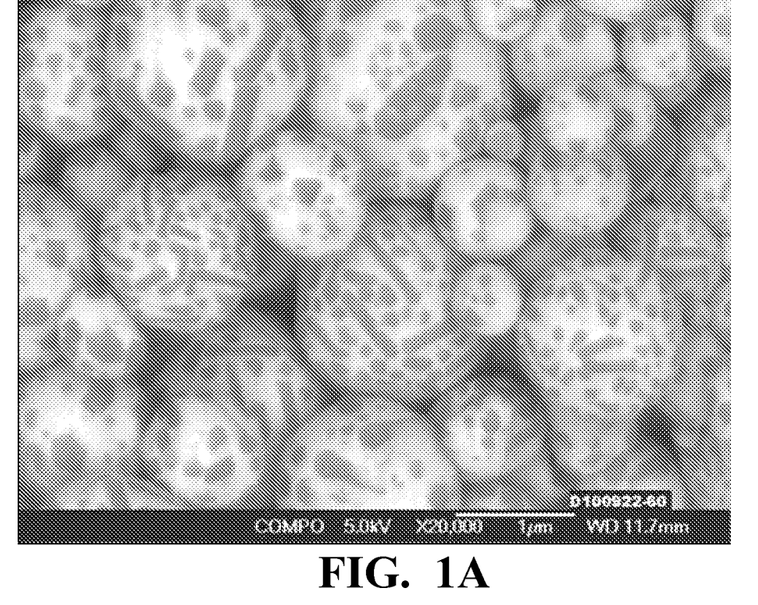
FIG. 1A shows the BS-SEM picture of Example 1 showing the spherical glass-crystalline particles. The lighter areas are the glass component, and the darker areas are the crystalline components containing zinc oxide.
Figure 1B:
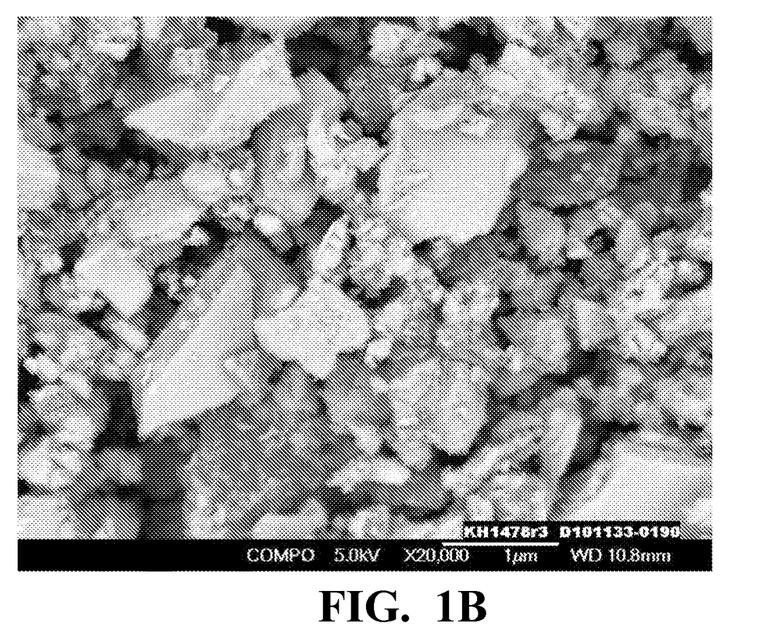
FIG. 1B shows the BS-SEM picture of Comparative example 1 in which the glass particles are the light colored particles and the dark areas are zinc silicate.
Figure 1C:
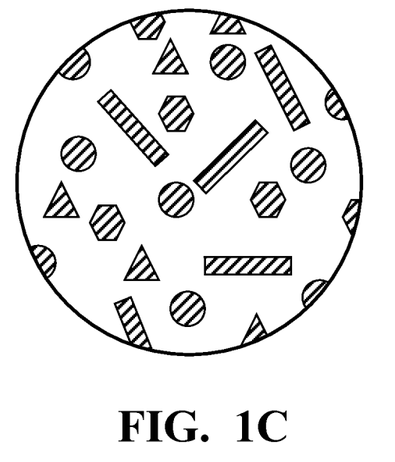
FIG. 1C illustrates the surface of a spherical glass-crystalline particle containing a low % of crystalline metal oxide. The white areas represent glass components and the dark areas represent crystalline components.
Figure 1D:
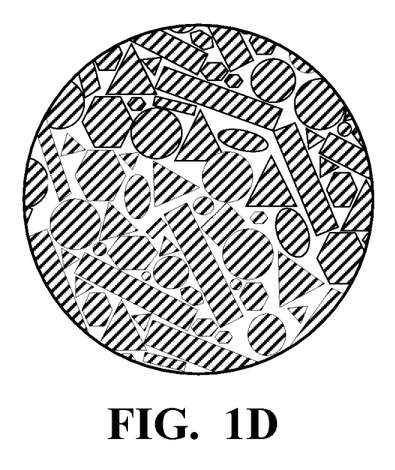
FIG. 1D illustrates the surface of a spherical glass-crystalline particle with more crystalline metal oxide. The white areas represent glass components and the dark areas represent crystalline components.
Figure 2A:
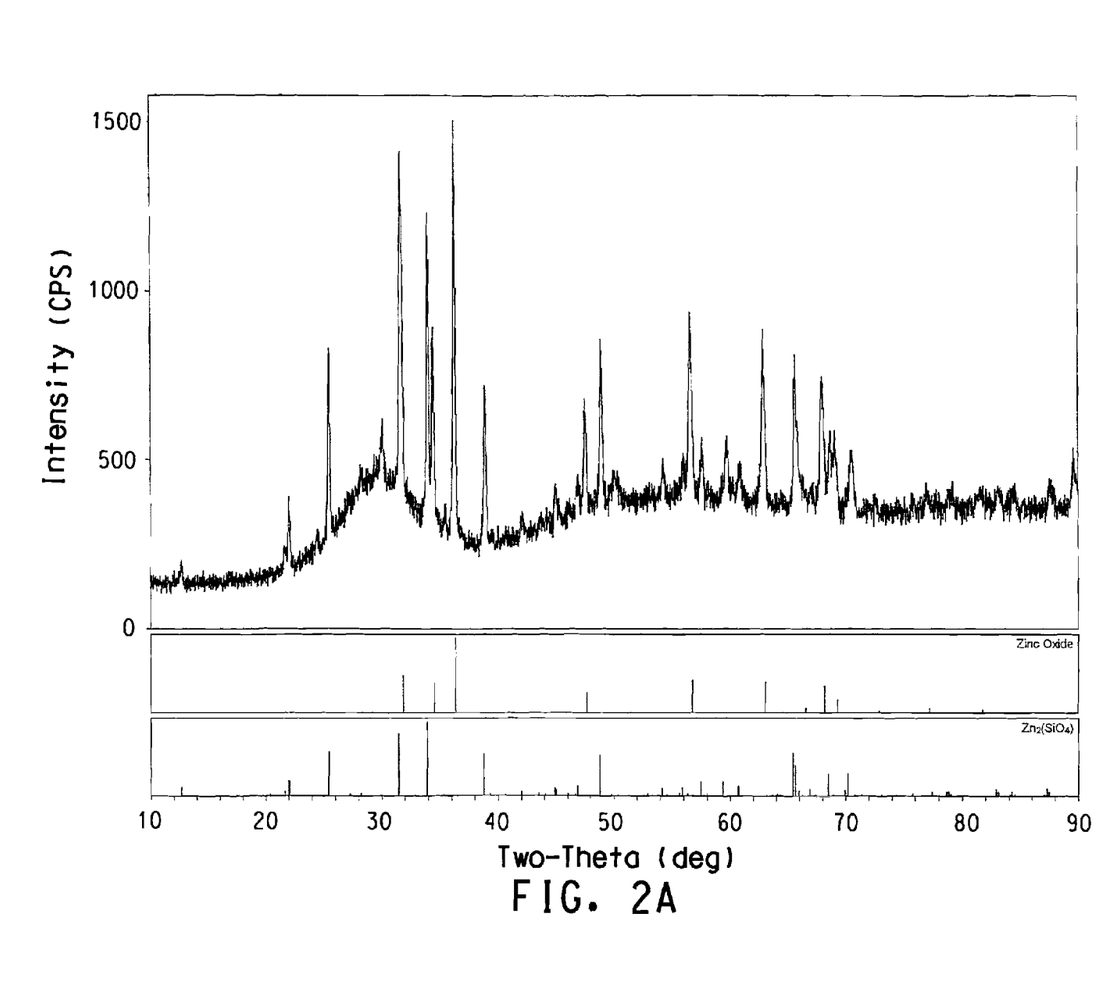
FIG. 2A shows the XRD (X-ray Diffraction) pattern of the spherical glass-crystalline particles of Example 1 showing the amorphous glass pattern (very broad peak) and the crystalline peaks of zinc oxide and zinc silicate.
Figure 2B:
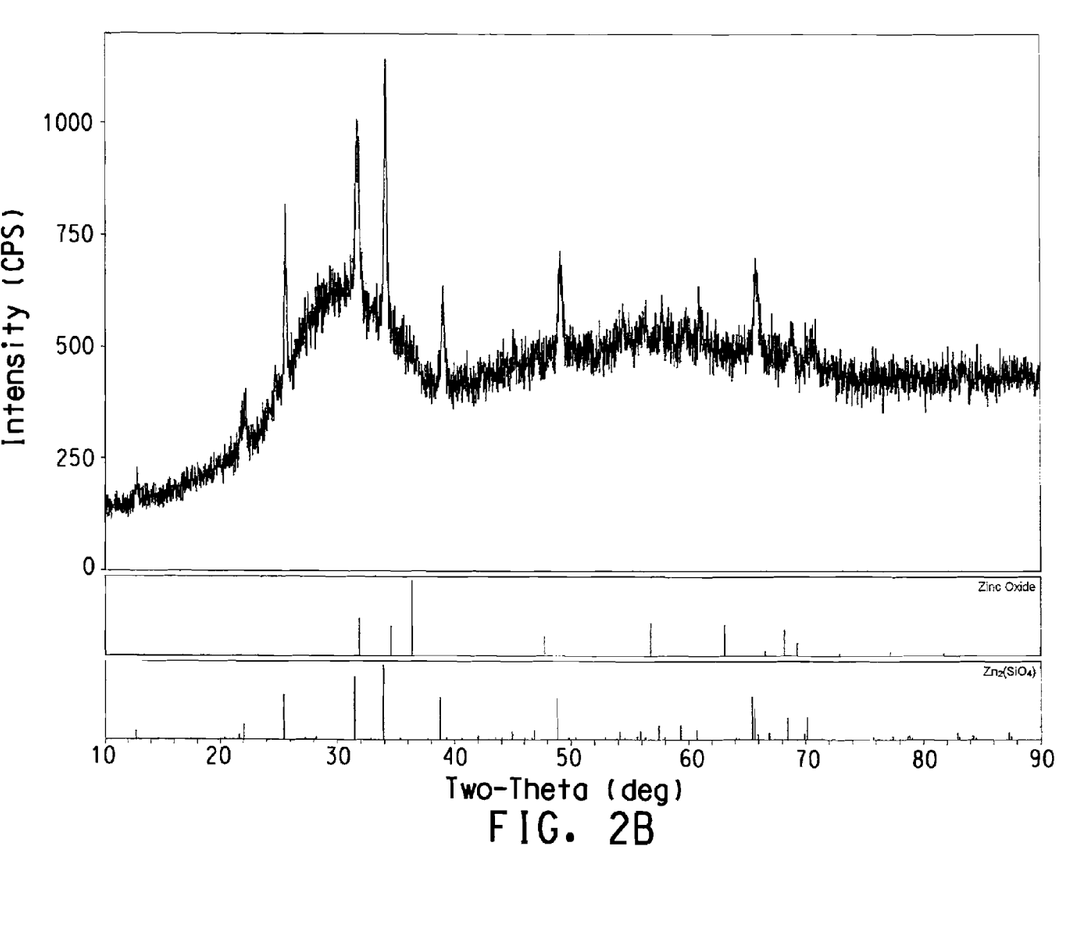
FIG. 2B is the XRD pattern from the glass particles and zinc silicate particles from Comparative example 1, showing the amorphous glass pattern evident by the broad signal over the range 20°-40° $2\theta$ and the crystalline peaks of zinc silicate only, and no peak corresponding to zinc oxide.

The synthesized powders were analyzed by XRD to assess devitrification products and BS-SEM with EDX to reveal powder morphology while obtaining data about chemical composition of morphological features. XRD data of the bulk powder shown in FIG. 2 displayed characteristics of partial crystallization in a glassy matrix. Crystalline willemite, $Zn_2SiO_4$, was observed to be present. BS-SEM and EDX revealed that the powder samples consisted of particles with an irregular shaped morphology characteristic of hard glassy materials which had been milled. The sample contained particles of two distinct types; a population of homogenous particles appearing of lighter contrast in BS-SEM with a composition of the glass component composition when analyzed by EDX, and a distinctly different population of particles appearing of darker contrast in BS-SEM with a chemical make-up of only Zn, Si, and O indicating these were particles of crystalline willemite. Some of these darker particles could be observed with some traces of a lighter contrast residue of the glassy phase on periphery of individual particles. In general, these powder samples included primary particles of either homogenous glass or crystalline willemite.

What is claimed is:
1. A plurality of glass-crystalline particles, wherein at least a portion of the glass-crystalline particles comprise a glass component and a crystalline component, and wherein the crystalline component comprises one or more metal oxides wherein the metal is selected from the group consisting of:

Zn, Ca, Sr, Mg, Ba, and mixtures thereof, wherein the surface area of the crystalline component is from 0.1 m$^2$/g to 3.0 m$^2$/g.

2. The plurality of glass-crystalline particles of claim 1, wherein at least a portion of the glass-crystalline particles are substantially spherical.

3. A powder comprising the plurality of glass-crystalline particles of claim 1.

4. The plurality of glass-crystalline particles of claim 1, wherein the $d_{50}$ is between 0.2 microns and 3.0 microns.

5. The plurality of glass-crystalline particles of claim 1, wherein the $d_{95}$ is between 0.5 microns and 5.0 microns.

6. The plurality of glass-crystalline particles of claim 1, wherein the plurality of glass-crystalline particles have a surface area when divided by the $d_{10}$ of at least a portion of the glass-crystalline particles is between 0.5 m$^2$/g·m and 5.0 m$^2$/g·m.

7. The plurality of glass-crystalline particles of claim 1, wherein the plurality of glass-crystalline particles have a surface area when divided by the $d_{50}$ of at least a portion of the glass-crystalline particles is between 0.3 m$^2$/g·m and 3.0 m$^2$/g·m.

8. The plurality of glass-crystalline particles of claim 1, wherein the plurality of glass-crystalline particles have a surface area when divided by the $d_{95}$ of at least a portion of the glass-crystalline particles is between 0.2 m$^2$/g·m and 2.0 m$^2$/g·m.

9. A thick film composition comprising an organic medium, a conductive powder, and the plurality of glass-crystalline particles of claim 1.

10. A device comprising, prior to firing, the thick film composition of claim 9.

11. A plurality of glass-crystalline particles, wherein at least a portion of the glass-crystalline particles are spherical, wherein at least a portion of the glass-crystalline particles comprise a glass component and a crystalline component, and wherein the crystalline component comprises one or more metal oxides, wherein the surface area of the crystalline component is from 0.1 m$^2$/g to 3.0 m$^2$/g.

12. The plurality of glass-crystalline particles of claim 11, wherein the one or more metal oxides wherein the metal is selected from the group consisting of: Zn, Ca, Sr, Mg, Ba, and mixtures thereof.

13. The plurality of glass-crystalline particles of claim 11, wherein at least a portion of the glass-crystalline particles comprise a glass component and a crystalline component, wherein the crystalline component is 45-80 wt % of the particle.

14. A plurality of glass-crystalline particles, wherein at least a portion of the glass-crystalline particles comprise a glass component and a crystalline component, wherein the crystalline component comprises one or more metal oxides, and wherein the surface area of the crystalline component is from 0.1 m$^2$/g to 3.0 m$^2$/g.

* * * * *